United States Patent [19]

Peck

[11] Patent Number: 5,427,184
[45] Date of Patent: Jun. 27, 1995

[54] CRANK ADJUSTED DEPTH CONTROL FOR AN IMPLEMENT

[75] Inventor: Donald R. Peck, Clive, Iowa

[73] Assignee: Deere & Company, Moline, Ill.

[21] Appl. No.: 224,462

[22] Filed: Apr. 7, 1994

[51] Int. Cl.⁶ .............................................. A01B 63/16
[52] U.S. Cl. .................... 172/395; 172/423; 172/430; 172/415; 172/504; 172/397
[58] Field of Search ............ 172/395, 396, 397, 422, 172/427, 423, 430, 406, 78, 407, 415, 418, 424, 426, 491, 504; 280/704, 43; 414/474, 476; 74/526; 192/138; 200/47

[56] References Cited

U.S. PATENT DOCUMENTS

| | | | |
|---|---|---|---|
| 1,088,643 | 2/1914 | Williams | 172/504 |
| 2,556,274 | 6/1951 | Hemmert | 172/427 |
| 2,580,100 | 12/1951 | Johansen et al. | 172/396 |
| 4,356,780 | 11/1982 | Bauman | 172/395 X |
| 4,646,620 | 3/1987 | Buchl | 172/430 X |
| 5,176,286 | 12/1992 | Bossler | 172/395 X |
| 5,192,101 | 3/1993 | Richardson | 280/704 |
| 5,234,060 | 8/1993 | Carter | 172/413 |
| 5,277,257 | 1/1994 | Thompson et al. | 172/423 X |

OTHER PUBLICATIONS

Deere & Co., brochure entitled John Deere "Dig Down Deeper", pp. 4 and 5 and front and back covers, Dec. 1988, published in the U.S.A.
Deere & Co., brochure entitled John Deere "Seedbed Tillage", front and back covers and pp. 14–15, Sep. 1993, published in the U.S.A.

*Primary Examiner*—Randolph A. Reese
*Assistant Examiner*—Victor Batson

[57] ABSTRACT

A depth control includes an actuator tube connected for movement with the rockshaft and having a threaded crank supported on the forward end of the tube. A valve operator bracket is slidably and nonrotatably received over the tube and includes a threaded portion engaging the crank threads to positively locate the bracket relative to the tube. The bracket carries a plunger which, as the rockshaft lowers the implement to the working position, is moved into contact with a valve actuator to close a valve and prevent further lowering of the implement. One turn of the crank gives the same positive movement along the tube each time the depth setting is adjusted so that working depth can be set very accurately and easily.

12 Claims, 2 Drawing Sheets

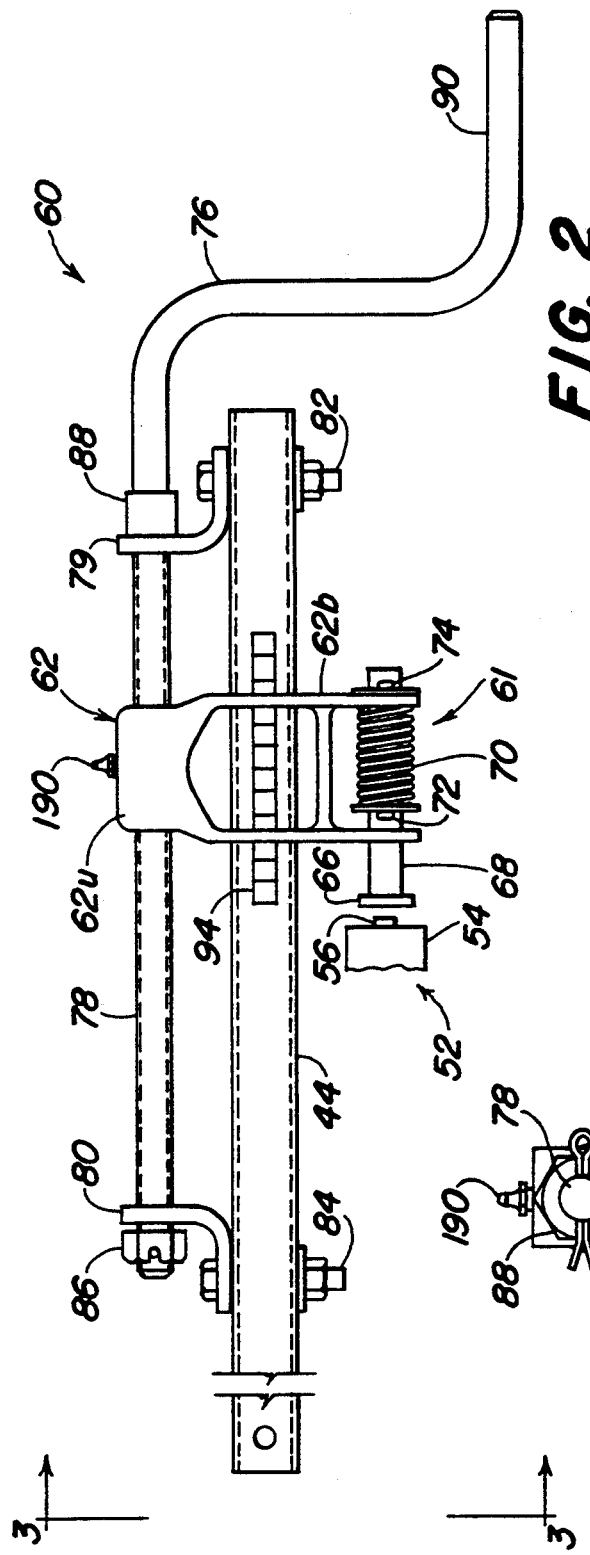
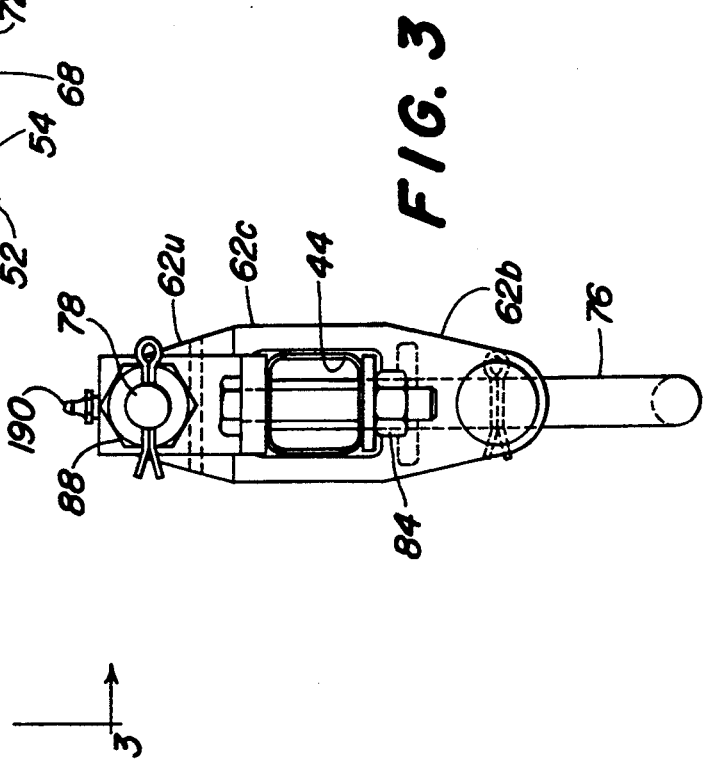

CRANK ADJUSTED DEPTH CONTROL FOR AN IMPLEMENT

BACKGROUND OF THE INVENTION

1) Field of the Invention

The present invention relates generally to depth control systems for agricultural implements, and, more specifically, to an adjustable bracket and valve structure for such systems.

2) Related Art

Many hydraulically controlled agricultural implements utilize a single point depth control system wherein implement depth is monitored and adjusted at a single location on the implement. Typically a plunger bracket assembly is slidably mounted on an actuator tube operably connected to the implement rockshaft. A plunger on the assembly contacts a poppet valve to stop fluid flow from the hydraulic lift cylinders at a preselected depth. To adjust depth, a set screw on the bracket assembly is loosened, and the bracket assembly is slid along the tube. The screw is tightened to secure the assembly at the desired location along the tube. Normally the amount of depth adjustment is small. When the set screw is unthreaded, the bracket is loosened from the tube and slides on the tube, often to a wrong location. The bracket has to be manually moved, and the amount of adjustment has to be determined visually. When the set screw is tightened, the bracket often changes location. Several trials may be required to achieve the desired position. Therefore, depth adjustment is often imprecise, difficult to repeat, and time consuming.

In another type of depth control, which is the subject of copending and commonly assigned application Ser. No. 08/074,233, filed Jun. 9, 1993, and entitled REMOTELY ADJUSTABLE DEPTH CONTROL, a long crank is provided to adjust a linkage adjacent the depth control cylinder. Although such a device has the advantage of directly monitoring cylinder extension and retraction, the valve and linkage components are more complicated, expensive and difficult to access, and are subject to damage by crops and soil passing through the machine. Also, this type of device relies on intermittent contact between an activating cylinder pin and a portion of the system that actually controls the oil flow.

BRIEF SUMMARY OF THE INVENTION

It is therefore an object of the present invention to provide an improved single point depth control for an implement. It is another object to provide such a depth control which overcomes most or all of the above mentioned problems.

It is a further object of the present invention to provide an improved single point depth control for an implement which is simpler in construction and easier to adjust than at least most previously available single point depth controls. It is yet another object to provide such a depth control which does not require a component to be loosened from the actuator tube for adjustment.

It is still another object of the present invention to a provide an improved depth control which is precisely adjustable. It is still another object to provide such a depth control wherein small depth adjustments can be easily accomplished without close visual inspection. It is yet another object to provide such a control which is more easily accessed than at least most previously available single point depth control structures.

A depth control constructed in accordance with the teachings of the present invention includes an actuator tube connected for movement with the rockshaft and having a threaded crank supported on the tube at the forward end of the implement frame. A valve operator bracket is supported by the tube and includes a threaded portion to positively locate the bracket relative to the tube. The bracket includes a valve operating member which, as the rockshaft lowers the implement to the working position, is moved into contact with a valve actuator to close a valve and prevent further lowering of the implement. One turn of the crank gives the same positive movement along the tube each time the depth setting is adjusted so that working depth can be set very accurately and easily. The magnitude of movement of the plunger bracket, and thus the sensitivity of the adjustment, is determined by the pitch of the threads. The bracket includes a casting which encompasses the tube and restricts the bracket against pivoting as the crank is turned. There are no loose parts at any time during operation or adjustment, and adjustments can be made quickly with a single hand without additional tools. The device is very simple, inexpensive and reliable. The operative components are located away from the damaging effects of crops and soil, and the components are easy to access and service.

These and other objects, features and advantages of the present invention will become apparent to one skilled in the art upon reading the following detailed description in view of the drawings.

BRIEF DESCRIPTION OF THE DRAWINGS

FIG. 2 is an enlarged side view of the depth control of FIG. 1.

FIG. 3 is a view taken along lines 3—3 of FIG. 2.

DETAILED DESCRIPTION OF THE DRAWINGS

Figure 1:
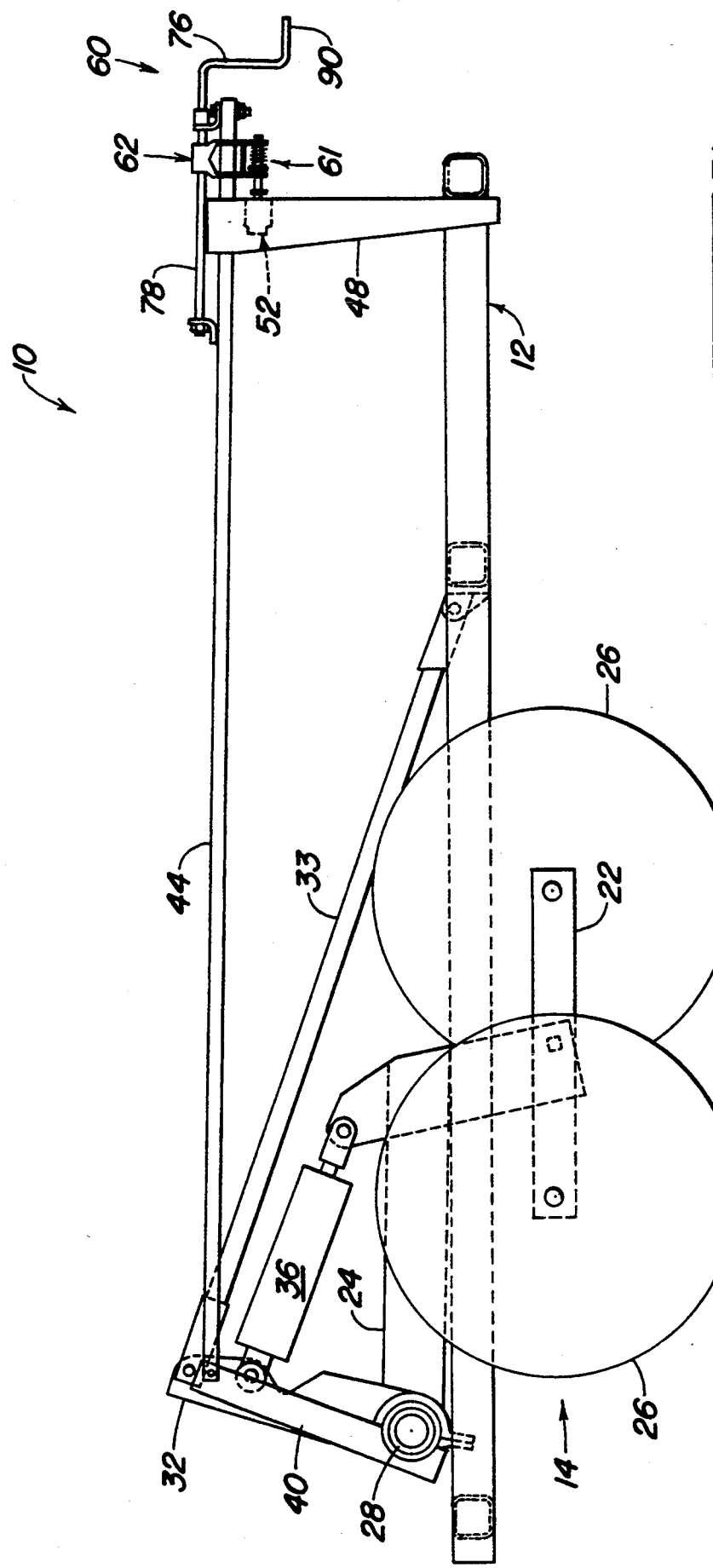
FIG. 1 is a side view of a tillage tool with the depth control constructed in accordance with the teachings of the present invention.

Referring now to FIG. 1, therein is shown a tillage implement such as a field cultivator 10 having a main frame 12 supported for forward movement over the ground by transversely spaced lift wheel assemblies 14. Conventional earthworking tools (not shown) depend from the frame 12 and work the soil to a preselected depth dependent on the position of the lift wheel assemblies 14.

The lift wheel assemblies 14 include a fore-and-aft extending walking beam 22 pivotally connected to a lift arm 24 and supporting ground wheels 26 for rotation about transverse axes. The lift arm 24 is fixed to a transversely extending rockshaft 28, and an arm 32 extends upwardly from a pivotal connection with the rockshaft to a connection with the base end of a lift cylinder 36. The upper end of the arm 32 is connected to a diagonal brace having a forward end fixed to the frame 12 forwardly of the lift wheel assembly 14 to secure the arm 32 in a preselected angular position. The rod end of the cylinder 36 is pivotally connected to the lift arm 24 so that upon extension of the cylinder the wheel assembly 14 is rocked downwardly to raise the frame 12. As the cylinder 36 is retracted, the lift wheel assembly 14 is raised to lower the frame 12.

An actuator arm 40 is fixed to and extends upwardly from the rockshaft 28 for rotation with the rockshaft as the lift wheel assembly 24 is raised and lowered. A fore-and-aft extending actuator tube 44 includes an aft end pivotally connected to the upper end of the actuator arm 40. The forward end of the tube 44 is slidably supported by an upright bracket 48 fixed to the forward end of the frame 12 so that the tube 44 can move forwardly as the wheel assembly 14 is lowered relative to the frame and rearwardly as the assembly 14 is raised relative to the frame. The bracket 48 also supports a valve assembly 52 which includes a valve 54 and a valve actuator 56. The valve 54 is connected between selective control valve (SCV) on the towing vehicle (not shown) and the base end of the cylinder 36. The valve actuator 56 is biased to the extended position as shown in FIG. 2 wherein the valve is open and free flow of hydraulic fluid is permitted from the base end of the cylinder 36 so the frame 12 can be lowered by positioning the SCV to provide a fluid path from the base end of the cylinder to the reservoir of the hydraulic system. Upon depression of the actuator 56, free flow from the base end of the cylinder 36 is interrupted to establish a machine working depth.

An adjustable valve actuator assembly 60 is mounted on the forward end of the actuator tube 44 to depress the actuator 56 at the selected machine working depth. As shown, the assembly 60 includes a crank operated screw thread adjusted plunger 61 for ease and precision of adjustment. The actuator assembly 60 includes a plunger bracket 62 having a central portion 62c received over and slidable along the tube 44. The plunger bracket 62 also includes an upper threaded portion 62u offset above the tube 44, and a lower portion 62b offset on the opposite side of the tube 44 from the portion 62u and supporting the plunger 61 so that it intercepts the actuator when the tube 44 is moved rearwardly upon lowering of the frame 12. The plunger 61 includes a rearwardly facing contact surface 66 connected to a shank 68 slidably received in the portion 62b and biased to a rearward operating position (shown in FIG. 2) by a spring 70 compressed between a pin and washer 72 and the aft leg of the portion 62b. A second pin and washer 74 prevent the shank 68 from sliding rearwardly beyond the operating position.

As shown in FIG. 2, the adjustable valve actuating assembly 60 includes a crank 76 having a threaded shank 78 screwed into mating threads machined in the upper portion 62u of the plunger bracket 62. The crank 76 is supported from the tube 44 by forward and aft angle brackets 79 and 80, respectively, secured to the top face of the tube 44 by bolts 82 and 84. A castle nut 86 at the aft end of the shank 78 and a collar 88 near the forward end of the shank secure the crank against axial movement relative to the tube 44 while permitting free rotation of the crank to change the location of the bracket 62 on the tube. Preferably, the bracket 62 is cast from metal and captures the tube 44 (FIG. 3) to prevent pivoting or other unwanted movement of the bracket on the tube and to facilitate a simple one-handed adjustment.

A crank handle 190 projects forwardly from the forward end of the tube 44 ahead of the frame 12 (FIG. 1) for easy access by an operator. As the crank handle 90 is rotated and the upper portion 62u is threaded along the shank 78, the position of the contact surface 66 shifts relative to the tube 44 to adjust the point at which the plunger 61 activates the valve 54 to set the operating position of the frame 12 upon retraction of the cylinder 36.

A grease fitting 90 at the top of the portion 62u facilitates lubrication of the mating screw threads on the shank 78 and in the bracket 62. Indices 94 are provided on the side of the tube 44 so that the position of the plunger bracket 62 relative to the tube can be determined by a quick visual inspection, although adjustments can be made easily from a given setting without visual inspection by simply counting revolutions of the crank 76. The amount of adjustment per revolution of the crank depends on the thread pitch, and for convenience the pitch is selected to provide a fraction of an inch vertical frame height for every revolution of the crank.

Having described the preferred embodiment, it will become apparent that various modifications can be made without departing from the scope of the invention as defined in the accompanying claims.

I claim:

1. An adjustable depth control for a framed implement having a fore-and-aft extending frame, a rockshaft, a lift wheel assembly connected to the rockshaft, a hydraulic system connected to a rockshaft for rotating the rockshaft and moving the frame vertically, the control comprising:

a fore-and-aft extending actuator tube having an axis and connected for movement with the rockshaft;

a valve actuator supported by the actuator tube for movement along a path with the actuator tube, the valve actuator selectively movable relative to the actuator tube to vary the path and having a rearwardly facing contact surface;

an actuatable valve connected to the hydraulic system for controlling rotation of the rockshaft, wherein the valve is supported adjacent the forward end of the actuator tube generally in the valve actuator path and includes a forwardly projecting member selectively contactible by the rearwardly facing contact surface;

a threaded rod supported for rotation by the actuator tube for movement therewith and having a threaded portion, the threaded rod having a crank portion extending forwardly from the actuator tube for rotating the threaded portion, the threaded portion positioned adjacent the forward end of the tube and connected to the valve actuator for fore-and-aft movement of the valve actuator to change valve actuator position as the threaded rod is rotated; and wherein the crank portion projects forwardly from the forward end of the frame and is positioned forwardly of the actuatable valve to facilitate adjustment of the valve actuator position from the forward end of the frame.

2. The invention as set forth in claim 1 including a bracket supported by the actuator tube and receiving the threaded portion, wherein the bracket generally encompasses the actuator tube to prevent rotation of the bracket as the threaded rod is rotated.

3. The invention as set forth in claim 1 wherein the crank portion includes a crank handle supported forwardly of the forwardmost end of the actuator tube.

4. The invention as set forth in claim 3 wherein the crank has an axial length substantially less than the length of the actuator tube.

5. The invention as set forth in claim 1 wherein the threaded rod is supported parallel to the tube axis, and the bracket includes a central portion generally encompassing the actuator tube.

6. An adjustable depth control for a framed implement having a fore-and-aft extending frame, a rockshaft, a lift wheel assembly connected to the rockshaft, a hydraulic system connected to a rockshaft for rotating the rockshaft and moving the frame vertically, the control comprising:

a fore-and-aft extending actuator tube having an axis and connected for movement with the rockshaft;

a valve actuator supported by the actuator tube for movement along a path with the actuator tube, the valve actuator selectively movable relative to the actuator tube to vary the path;

an actuatable valve connected to the hydraulic system for controlling rotation of the rockshaft, wherein the valve is supported adjacent the forward end of the actuator tube generally in the valve actuator path; and a threaded rod supported for rotation on the actuator tube and having a threaded portion and a crank portion extending forwardly from the actuator tube for rotating the threaded portion, the threaded portion positioned adjacent the forward end of the tube and connected to the valve actuator for fore-and-aft movement of the valve actuator to change valve actuator position as the threaded rod is rotated;

a bracket supported on the actuator tube and receiving the threaded rod;

wherein the threaded rod is supported parallel to the tube axis, and the bracket includes a central portion generally encompassing the actuator tube; and wherein the threaded portion is offset on one side of the central portion and further including a plunger offset on the opposite side of the central portion.

7. An adjustable depth control for a framed implement having a fore-and-aft extending frame, a rockshaft, a lift wheel assembly connected to the rockshaft, a hydraulic system connected to a rockshaft for rotating the rockshaft and moving the frame vertically, the control comprising:

an actuator tube having a fore-and-aft extending axis and connected to the rockshaft for movement in the fore-and-aft direction as the rockshaft rotates, the actuator tube including a forward end;

a valve actuator; and means adjustably supporting the valve actuator adjacent the forward end of the actuator tube for movement along a path with the actuator tube, the means adjustably supporting including an actuator bracket slidably and nonrotatably supported on the tube for sliding movement threrealong, and a rotatable crank supported by the forward end of the tube and having a threaded shaft portion extending through the actuator bracket for moving the bracket in the fore-and-aft direction as the crank is rotated.

8. The invention as set forth in claim 7 wherein the actuator bracket encompasses the actuator tube.

9. The invention as set forth in claim 7 wherein the crank has a length substantially less than the length of the actuator tube.

10. The invention as set forth in claim 7 wherein the crank includes a handle located at the forward end of the implement.

11. The invention as set forth in claim 7 wherein the actuator tube has a fore-and-aft extending tube axis, the threaded shaft portion is supported parallel to the tube axis, and the actuator bracket includes a central portion encompassing the tube.

12. The invention as set forth in claim 11 wherein the actuator bracket includes a threaded portion offset on one side of the central portion for threadably receiving the threaded portion, and the valve actuator includes a plunger offset on the side of the central portion opposite said one side.

* * * * *